April 1, 1952 J. J. HEGARTY 2,591,544
STACKING TRUCK
Filed Dec. 22, 1949 3 Sheets-Sheet 1

INVENTOR.
John J. Hegarty
BY Heard Smith & Tennant
Attorneys

April 1, 1952   J. J. HEGARTY   2,591,544
STACKING TRUCK
Filed Dec. 22, 1949   3 Sheets-Sheet 2
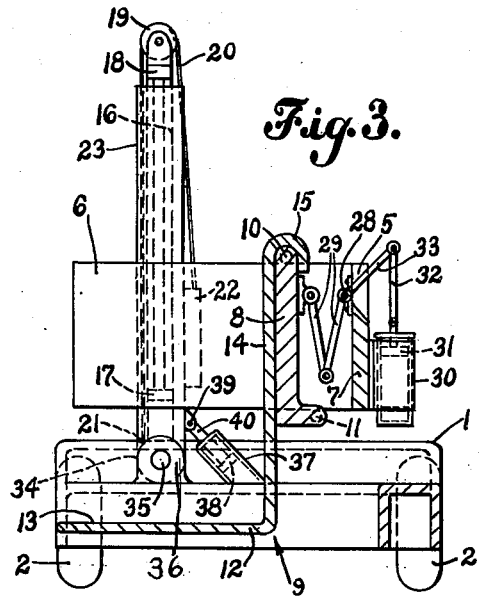
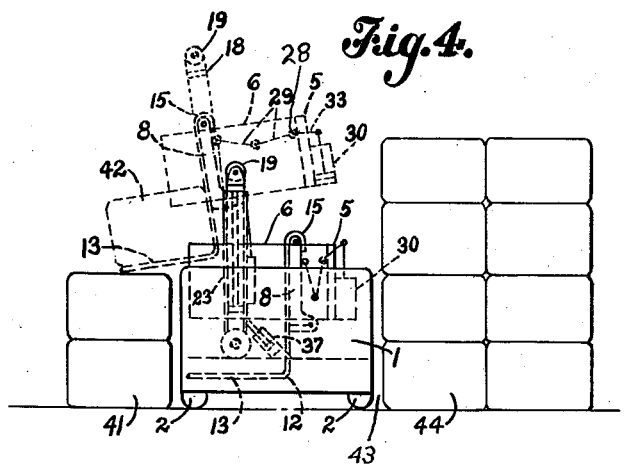
INVENTOR.
John J. Hegarty
BY Heard Smith & Tennant
Attorneys

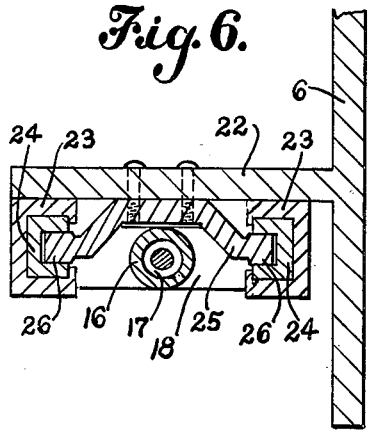
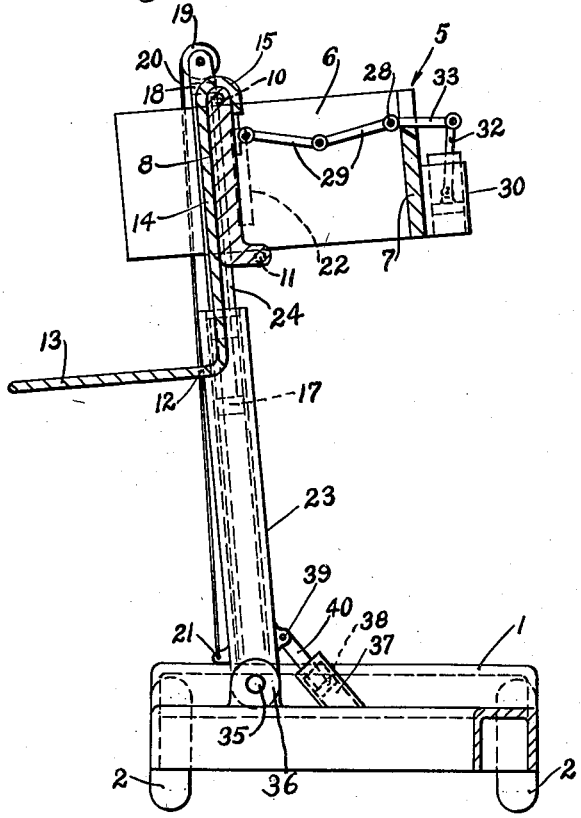
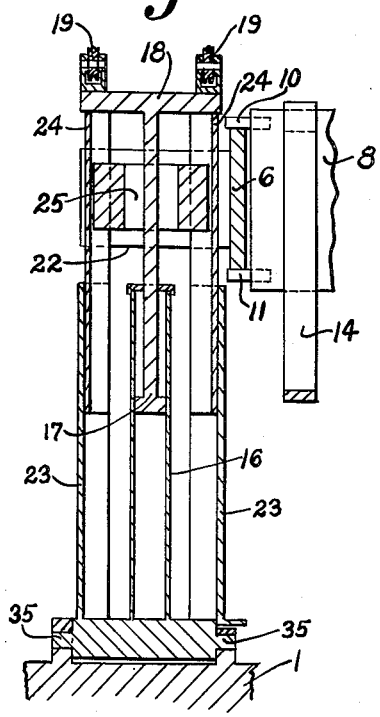

Patented Apr. 1, 1952

2,591,544

UNITED STATES PATENT OFFICE 2,591,544

STACKING TRUCK

John J. Hegarty, Medford, Mass.

Application December 22, 1949, Serial No. 134,522

6 Claims. (Cl. 214—65)

This invention relates to a truck designed for transporting material and depositing it in piles or stacks. Trucks for this purpose usually have a load-carrying member in the form of a fork and are provided with means for raising the fork with its load to the proper height to permit the load on the fork to be deposited on the pile or stack. Such trucks are sometimes referred to as "fork trucks."

Heretofore trucks of this type have been made with the load-carrying fork at the front end of the truck. With this arrangement, when the load which a truck carries is to be deposited on a stack or pile, it is necessary to manipulate the loaded truck so that it will face the stack, thus placing the fork in a position whereby when the fork is raised, the load thereon can be readily deposited on the top of the pile or stack.

If material is being stacked by a truck of this type in an area where there are several stacks separated by aisles in which the trucks travel, it is necessary that the aisles be wide enough to permit the loaded truck entering any aisle to maneuver into a position facing the stack and at right angles to the length of the aisle. With such an arrangement a considerable portion of the floor or ground space where the stacks are located is taken up by the wide aisles between the stacks.

It is one object of my invention to provide a novel stacking truck or fork truck which is constructed so that the load can be delivered from the side thereof instead of from the front end so that the load carried by any truck can be deposited from the fork of the truck on the pile or stack while the truck is in a position parallel to the stack. With my invention there is no necessity for maneuvering the loaded truck in the aisle to put it into a position to deliver its load on to the stack, because when the loaded truck has simply been driven into the aisle and is occupying a position parallel to the face of the stack, it is then in correct position to have its load elevated and deposited on to the stack.

With my improved truck, therefore, the aisles between adjacent stacks need be only wide enough to allow the truck to be driven therethrough, because no manipulation of the truck in the aisle is necessary to present the fork in proper position to deposit its load on the stack.

Another object of my invention is to provide a side delivery stacking truck in which the load-carrying fork is situated between the front and rear end of the truck and faces toward the side of the truck.

Other objects of the invention will be apparent from the following description of a selected embodiment of my invention.

In the drawings,

Fig. 3 is a section on the line 3—3, Fig. 2.

Fig. 4 is a more or less diagrammatic view showing a truck in an aisle between stacks and in position to deliver its load on to one of the stacks.

Fig. 5 is a section similar to Fig. 3 but showing the fork in elevated position.

Fig. 6 is a section on the line 6—6, Fig. 2.

Fig. 7 is a section on the line 7—7, Fig. 1.

Figure 1:
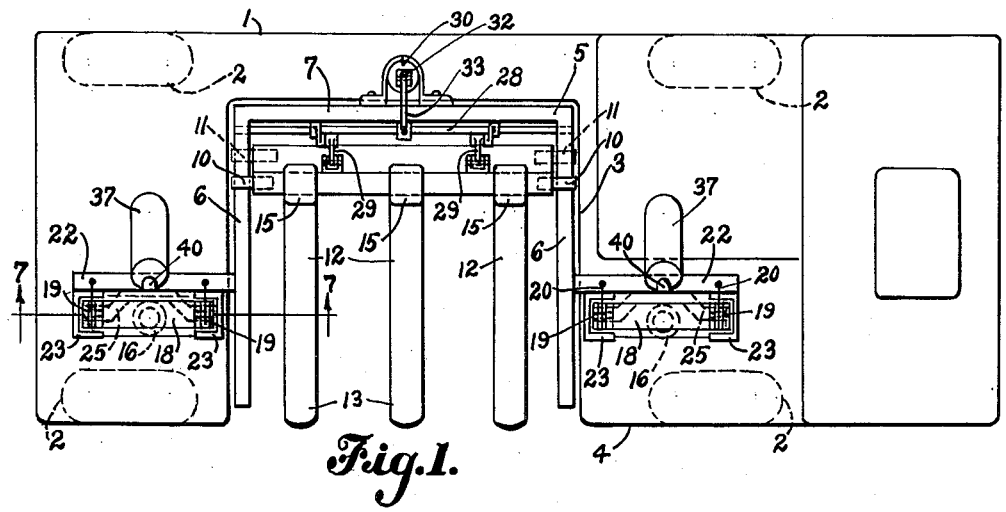
Fig. 1 is a plan view of a truck embodying my invention.

My improved truck comprises a truck body 1 mounted on wheels 2 as usual, and said truck, which is a self-propelled truck, may be driven by any suitable means such as an internal combustion engine or by an electric motor, neither of which is shown in the drawings as they form no part of the present invention.

The truck body is provided with a fork-receiving opening 3 which is located between the front and rear wheels and extends from one side 4 of the truck body nearly to the opposite side.

Mounted on the truck for vertical movement is a U-shaped fork-supporting member 5, the legs or sides 6 of which extend transversely of the truck; said legs being connected by the back or bridge portion 7. Situated between the legs 6 of the supporting member 5 and mounted thereon is a carriage 8 which supports the fork element 9. The carriage 8 is shown as having at its upper end rolls 10 which ride on the top edge of the legs 6 of the support, and at its lower end other rolls 11 which engage the lower edge of said legs or sides 6. The sides 6 of the fork-supporting member thus constitute rails on which the carriage moves.

The fork element 9 is shown as constituted by a plurality of separate L-shaped members 12, each member 12 having a horizontal load-supporting portion 13 and a vertically-extending portion 14 which is provided at its upper end with a hook portion 15 that hooks over the top of the carriage. These fork elements are thus separate from each other and are independently removable from the carriage.

The arrangement is such that the fork 9 faces toward the side of the truck as best seen in Figs. 1 and 3 and is situated within the fore and aft limits of the truck.

Means, preferably hydraulic means, is provided for moving the supporting member 5 upwardly thereby to elevate the fork and lift the load thereon from a low loading position to an elevated stacking position. The means herein shown for this purpose comprises two vertically extending cylinders 16, one in front of and the other in the rear of the supporting member 5, and a plunger 17 operating in each cylinder. Each plunger carries at its upper end a cross head 18 on which is mounted two pulleys 19. A cord 20 extends over each pulley, one end of each cord being anchored to the truck body as shown at 21 and the other end of each cord being anchored to a wing 22 which extends laterally from one of the legs 6 of the supporting members 5.

When, therefore, the plungers 17 are forced upwardly, the upward movement of the cross heads 18 will operate through the cords 20 and the wings 22 to raise the supporting member 5 thereby elevating the load-carrying fork.

Means are provided for guiding the supporting member 5 in its up and down vertical movement, and for this purpose each of the cylinders 16 has associated therewith, one on each side thereof, two channel shaped guiding elements 23, and each cross head 18 has secured to it and depending therefrom a companion channel shaped guiding element 24 which is received in the corresponding guiding element 23.

Each wing 22 has rigid therewith two arms 25, the ends of which are received in the channels 26 of the guiding elements 24.

Each pair of guiding elements 23, 24 constitutes a telescoping guide for the arms 25, and by this means the supporting member 5 will be properly guided in its up and down movement.

With the arrangement shown, the upward movement of the supporting member 5 will be twice that of the upward movement of the cross heads 18 and if for instance the cross heads are moved upwardly two feet, the supporting member 5 with the fork mounted thereon will be moved upwardly four feet.

As stated above the cylinders 16 are preferably hydraulic cylinders and the upward movement of the plunger therein is obtained by forcing oil, water, or other liquid into the bottom of the cylinders, an operation which may be carried out in usual manner by means of a suitable pump.

Means are provided for moving the fork supporting carriage 8 longitudinally of the legs or sides 6 of the member 5 and transversely of the length of the truck body. For this purpose there is provided a shaft 28 which is secured to the bridge portion 7 of the supporting member 5, said shaft being connected to the carriage 8 by means of toggle lever connections 29.

When the carriage is in its rearward position shown in Fig. 3, the toggle lever connections 29 will be in their folded condition, but by rotating the shaft 28 in a clockwise direction, the toggle levers will be straightened as shown in Fig. 5 thereby moving the carriage 8 forwardly on the side members 6.

Any suitable means for operating the shaft 28 may be employed. The means herein shown for this purpose comprises a hydraulic cylinder 30 mounted on the bridge portion 7 of the supporting member 5 within which operates a piston 31, the piston rod 32 of which is pivotally connected to an arm 33 rigid with the shaft 28. When the piston 31 is moved downwardly, the shaft 28 will be turned clockwise and thus the carriage 8 will be moved toward the free ends of the sides 6 into the position shown in Fig. 5. An upward movement of the piston 31 will return the carriage 8 to its rearward position shown in Fig. 3. The cylinders 16 and their associated guides 23, 24 are mounted on the truck body for slight tilting movement in a direction transverse to the truck body. For this purpose each cylinder 16 and its associated telescoping guides 23, 24 is secured on a base member 34 which is mounted on the truck body to have a slight turning movement about an axis extending lengthwise of the truck body. Each base member 34 is shown as provided with trunnions 35 which operate in bearings 36 carried by the truck body. The tilting movement of each cylinder 16 and its associated telescoping guiding members 23, 24 is controlled by a hydraulic cylinder 37, which is mounted on the truck, and a piston 38 therein, the piston rod 40 of which is pivotally connected to the cylinder 16 as shown at 39.

In using the truck the fork element 9 will of course be in its lowered loading position when the load is deposited thereon. The loaded truck is then driven into a position alongside of the stack 41 on which said load is to be deposited, the truck then having a position parallel to the stack and the fork facing the stack. The supporting member 8 is then raised to stacking position to bring the fork 9 and its load to the proper elevation to permit the load to be transferred to the top of the stack 41. The hydraulic cylinders 37 are then operated to tilt the vertical cylinders 16 and the telescoping guides into the inclined position shown in Fig. 5 and the cylinder 30 is operated to move the carriage and the fork with its load forwardly on the sides 6 of the supporting member 5 thereby carrying the load over the stack 41. The load can then be removed from the fork and properly placed on the stack.

Figure 2:
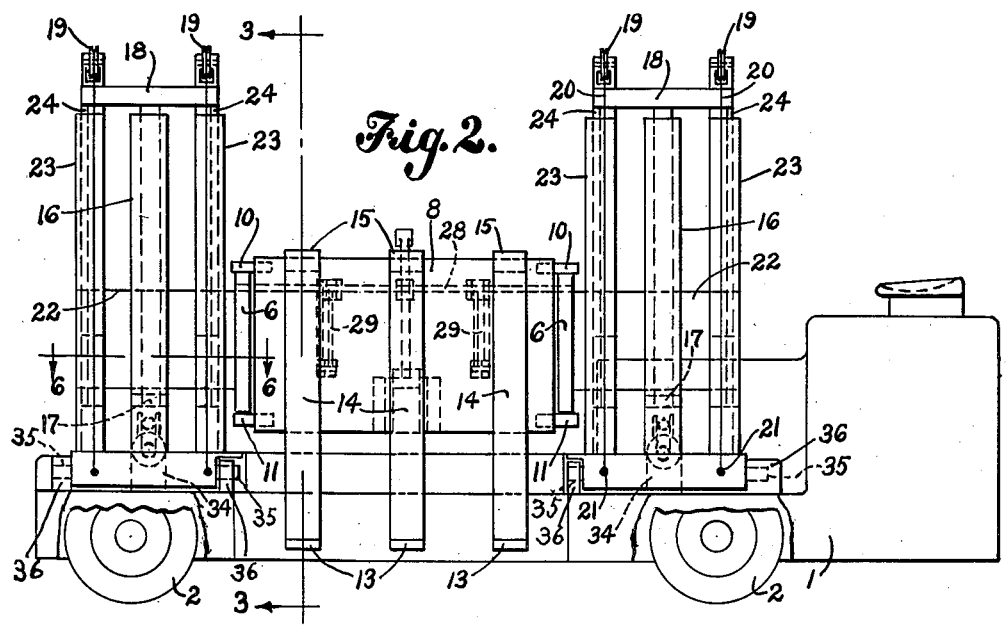
Fig. 2 is a side view thereof.

After the load has been deposited on the stack, the hydraulic cylinders 37 will be operated to return the cylinders 16 and the guides 23, 24 into their vertical position, and the fork may then be lowered from its elevated stacking position into its normal low loading position shown in Figs. 2 and 3. In the construction shown the carriage 8 with the fork 9 mounted thereon is movable between its retracted position in which the fork is located between the sides of the truck, as shown in Fig. 3, and its forward position shown in dotted lines, Fig. 4, while the fork-supporting member is in any vertically adjusted position between its low loading position and an elevated stacking position. Furthermore, the fork-supporting member is movable from its low loading position into an elevated stacking position, and vice versa, regardless of whether the carriage and the fork are in their retracted position or in their forward position.

An advantage derived from the use of my improved truck with its side delivery is that the truck will operate in an aisle 43 between two stacks 41 and 44 which is only wide enough to permit the truck to enter as illustrated best in Fig. 4. As a result a much larger proportion of the floor area of a warehouse or the ground area of a space where material is being stacked can be used for the stacks.

I claim:

1. A side delivery stacking truck comprising a truck body, a U-shaped fork-supporting member, means mounting said member on the truck body with the parallel sides of said member extending horizontally and transversely of the length of the truck and with the open side of said member facing one side of the truck body, a carriage mounted on said parallel sides of the fork-supporting member, a load-carrying fork supported by said carriage and having its tines extending transversely of the length of the truck, means to move said carriage on the parallel sides of the fork-supporting member in the direction of the length thereof between a retracted position in which the tines of the fork are located within the outline of the truck body and a forward position in which said tines are located beyond the truck body and at one side thereof, and means for raising and lowering as a unit the fork-carrying member with the carriage and fork supported thereby.

2. A side delivery stacking truck as set forth in claim 1 which includes means operative in any position of the fork-carrying member in its vertical movement for moving said carriage from its retracted position to its forward position.

3. A side delivery stacking truck comprising a truck body, two vertically extending guiding members mounted thereon, one adjacent the front end of the truck body and the other adjacent the rear end thereof, a vertically movable fork-supporting member guided in its vertical movement by said guiding members, said fork-supporting member having a pair of parallel rail elements extending transversely of the longitudinal axis of the truck body, a carriage mounted on said rail elements, a fork supported by said carriage, means to move the carriage on the rail elements from a retracted position in which the fork is located over the truck body and between the sides thereof and a forward position in which the fork is located beyond the side of the truck, and means for moving the fork-supporting member with the carriage and fork supported thereby vertically in said guiding members.

4. A side delivery stacking truck comprising a truck body, a fork-supporting member having tracks extending transversely of the lengthwise direction of the said truck body, means mounting the fork-supporting member on the truck body for vertical movement, a carriage movable on said tracks, a load-supporting fork mounted on said carriage and facing the longitudinal side of the truck body, means to move the fork-supporting member with the carriage and fork mounted thereon between a low loading position and an elevated stacking position, means to move said carriage with the fork mounted thereon on said tracks transversely of the truck body between a retracted position in which the fork is located between the side edges of the truck body and a forward position in which the fork is located beyond the side of the truck body.

5. A side delivery stacking truck as defined in claim 4 in which the means to move the carriage on the tracks is mounted on the vertically movable fork-supporting member and is operative in any vertical position thereof.

6. A side delivery stacking truck comprising a truck body, a U-shaped fork-supporting member, the sides of which extend transversely to the longitudinal axis of the truck body, a carriage mounted on said sides of the fork-supporting member and movable therebetween in the direction of their length, a load-carrying fork supported by the carriage and situated between the sides of the fork-supporting member, said fork having its load-supporting tines extending transversely of the length of the truck, means to move the fork-supporting member vertically between a low loading position and an elevated stacking position, and means to move the carriage and the fork supported thereby on the fork-supporting member between a retracted position in which the tines of the fork are located within the outlines of the truck body and a forward position in which the tines are located beyond the side of the truck body, said carriage moving means being operative when the fork-supporting member is in either its low loading position or elevated stacking position.

JOHN J. HEGARTY.

REFERENCES CITED

The following references are of record in the file of this patent:

UNITED STATES PATENTS

| Number | Name | Date |
| --- | --- | --- |
| 815,416 | Garland | Mar. 20, 1906 |
| 1,900,569 | Lederer | Mar. 7, 1933 |
| 1,903,431 | Abbe | Apr. 11, 1933 |
| 1,953,056 | Olen | Mar. 27, 1934 |
| 2,127,938 | Pride | Aug. 23, 1938 |
| 2,324,817 | Bratley | July 20, 1943 |
| 2,366,378 | Barrett | Jan. 2, 1945 |
| 2,437,806 | Dempster | Mar. 16, 1948 |
| 2,496,079 | Wessman | Jan. 31, 1950 |
| 2,574,045 | Lapham | Nov. 6, 1951 |